US007087270B2

(12) United States Patent
Lamarque-Forget et al.

(10) Patent No.: US 7,087,270 B2
(45) Date of Patent: *Aug. 8, 2006

(54) METHOD FOR PRODUCING A LIQUID CRYSTAL DEVICE WITH LOW ZENITHAL ANCHORING ENERGY, AND RESULTING DEVICE

(75) Inventors: Sandrine Lamarque-Forget, Magny les Hameaux (FR); Julien Roux, Saint Joseph des Bancs (FR); Ivan N. Dozov, Gif sur Yvette (FR); Philippe R. Martinot-Lagarde, Marcoussis (FR)

(73) Assignee: Nemoptic, Magney Les Hameaux (FR)

( * ) Notice: Subject to any disclaimer, the term of this patent is extended or adjusted under 35 U.S.C. 154(b) by 3 days.

This patent is subject to a terminal disclaimer.

(21) Appl. No.: 10/203,829

(22) PCT Filed: Dec. 11, 2001

(86) PCT No.: PCT/FR01/03921

§ 371 (c)(1),
(2), (4) Date: Nov. 18, 2002

(87) PCT Pub. No.: WO02/48782

PCT Pub. Date: Jun. 20, 2002

(65) Prior Publication Data

US 2003/0112396 A1  Jun. 19, 2003

(30) Foreign Application Priority Data

Dec. 12, 2000  (FR) .................................. 00 16135

(51) Int. Cl.
*B05D 5/06* (2006.01)
*B05D 7/24* (2006.01)
*B05D 3/02* (2006.01)
*B05D 3/06* (2006.01)
*G02F 1/1337* (2006.01)

(52) U.S. Cl. ...................... 427/553; 427/162; 427/165; 427/240; 427/355; 427/359; 427/384; 427/385.5; 428/1.2; 349/124

(58) Field of Classification Search ................ 427/553, 427/558, 162, 164, 165, 240, 425, 322, 355, 427/359, 368, 372.2, 384, 385.5; 428/1.2; 349/123, 124, 126, 128, 135, 136, 177, 186
See application file for complete search history.

(56) References Cited

U.S. PATENT DOCUMENTS

| 4,029,876 | A | * | 6/1977 | Beatty et al. ............... 204/165 |
| 4,608,129 | A | * | 8/1986 | Tamamura et al. ........... 205/50 |
| 5,268,783 | A | * | 12/1993 | Yoshinaga et al. ............ 349/88 |
| 5,648,829 | A | * | 7/1997 | Yano .......................... 349/129 |
| 5,805,253 | A | * | 9/1998 | Mori et al. .................. 349/118 |
| 5,837,354 | A | * | 11/1998 | Ogisu et al. ................. 428/208 |
| 6,084,649 | A | * | 7/2000 | Amano et al. ................. 349/96 |
| 6,310,674 | B1 | * | 10/2001 | Suzuki et al. ............... 349/139 |
| 6,791,649 | B1 | * | 9/2004 | Nakamura et al. .......... 349/137 |
| 2003/0232154 | A1 | * | 12/2003 | Lamarque-Forget et al. . 428/1.6 |

FOREIGN PATENT DOCUMENTS

GB  2 330 213 A  *  4/1999

* cited by examiner

*Primary Examiner*—Timothy Meeks
*Assistant Examiner*—Wesley D. Markham
(74) *Attorney, Agent, or Firm*—Blakely Sokoloff Taylor & Zafman (57) ABSTRACT

A method of making nematic liquid crystal devices where low energy zenith anchoring of the liquid crystal is obtained over confinement plates. A polymer or copolymer is deposited based on PVC onto a substrate. The polymer deposit is stabilized. An azimuth orientation is defined for the deposit to induce controlled azimuth anchoring of the liquid crystal.

6 Claims, 4 Drawing Sheets

METHOD FOR PRODUCING A LIQUID CRYSTAL DEVICE WITH LOW ZENITHAL ANCHORING ENERGY, AND RESULTING DEVICE

BACKGROUND OF THE INVENTION

1. Field of the Invention

The present invention relates to a seat belt electromagnetic lock for use in connection with seat belt retractor. The seat belt electromagnetic lock has particular utility in connection with an electrically actuatable locking mechanism for locking a seat belt retractor to prevent withdrawal of seat belt webbing.

2. Description of the Prior Art

Seat belt electromagnetic locks are desirable for preventing serious injury in the event of a traffic accident. News sources tell us that approximately fifty thousand people are killed in traffic accidents each year, many occur due to side impacts and some occur due to untensioned seat belts. Current seat belt designs only work properly if the belt is tensioned around the individual, due to intermittent locking a tension eliminator device was added to seat belts. If the tension eliminator is misused and a belt is pulled out more than necessary then it becomes ineffective. A need was felt to remove the tension eliminator while ensuring a good seat belt fit. Current seat belt designs also do not adequately address the need for side impact protection. Therefore the new design was made to meet both needs, a safe comfortable seat belt fit, and protection in the event of a side impact.

The use of seat belt retractor is known in the prior art. For example, U.S. Pat. No. 3,797,603 to Loomba discloses an electromagnetically controlled seat belt retractor that is a reel type retractor for a safety belt having the feature that an electromagnet, normally activated and holds a cam member by virtue of an armature attached thereto. This armature maintains a pawl out of latching engagement with the reel, thereby permitting free engagement with the reel, thereby permitting free extension of the belt. Any interruption of the current to the electromagnet permits the reel to rotate the cam, releasing a cam follower attached to the pawl bar, and allowing the biased pawl bar to rotate into locking engagement with the reel. However, the Loomba '603 patent does not include a locking wheel which has cylindrical locking bores, nor does it have cylindrical locking pins which fit within the locking bores, nor does it have a locking key that holds the locking pin within the locking bore, nor does it include a seat belt attached at the bottom central part of the seat, with the belt divided into two parts near the top of the back of the seat with one section extending downward over each side of the front of the seat.

Similarly, U.S. Pat. No. 4,895,317 to Rumpf et al discloses an electrically actuatable locking mechanism for a seat belt retractor that comprises a spindle having seat belt webbing wound thereon. The spindle is supported for the rotation in belt withdrawal and belt retraction directions. A member is moveable between a first position in which the spindle is free to rotate in the belt withdrawal direction a second position in which the spindle is blocked from rotating in the belt withdrawal direction. A permanent magnet is fixed to the member. An energizable electromagnet includes a core locate adjacent the permanent magnet for attracting the permanent magnet for attracting the permanent magnet to thereby move the member to one of its first and second positions when the electromagnet is de-energized. The core repels the permanent magnet to thereby move the member to the other one of its first and second positions upon energization of said electromagnet. However, the Rumpf et al '317 patent does not include a locking wheel which has cylindrical locking bores, nor does it have cylindrical locking pins which fit within the locking bores, nor does it have a locking key that holds the locking pin within the locking bore, nor does it include a seat belt attached at the bottom central part of the seat, with the belt divided into two parts near the top of the back of the seat with one section extending downward over each side of the front of the seat.

Lastly, U.S. Pat. No. 4,427,216 to Kato et al discloses a seat belt tensioning device that comprises a cylinder, a piston that is slidably inserted within the cylinder. A rod connects the piston and the seat belt. A piston pushing means is provided within the cylinder for applying driving force to the piston. A trigger means comprises a plurality of rings and balls interposed between opposing rings. The trigger means is provided in the cylinder for usually locking the rod into the cylinder overcoming the driving force of the piston pushing means and releasing the rod from the cylinder to allow the movement of the piston only at an urgent time. A driving means drives the trigger means to release the rod from the cylinder at an urgent time. However, the Kato et al '216 patent does not include a locking wheel which has cylindrical locking bores, nor does it have cylindrical locking pins which fit within the locking bores, nor does it have a locking key that holds the locking pin within the locking bore, nor does it include a seat belt attached at the bottom central part of the seat, with the belt divided into two parts near the top of the back of the seat with one section extending downward over each side of the front of the seat.

While the above-described devices fulfill their respective, particular objectives and requirements, the aforementioned patents do not describe a seat belt electromagnetic lock that allows an electrically actuatable locking mechanism for locking a seat belt retractor to prevent withdrawal of seat belt webbing. The Loomba '603, Rumpf et al '317, and Kato et al '216 patents make no provision for including a locking wheel which has cylindrical locking bores, nor do they have cylindrical locking pins which fit within the locking bores, nor do they have a locking key that holds the locking pin within the locking bore, nor do they include a seat belt attached at the bottom central part of the seat, with the belt divided into two parts near the top of the back of the seat with one section extending downward over each side of the front of the seat.

Therefore, a need exists for a new and improved seat belt electromagnetic lock that can be used for an electrically actuatable locking mechanism for locking a seat belt retractor to prevent withdrawal of seat belt webbing. In this regard, the present invention substantially fulfills this need. In this respect, the seat belt electromagnetic lock according to the present invention substantially departs from the conventional concepts and designs of the prior art, and in doing so provides an apparatus primarily developed for the purpose of an electrically actuatable locking mechanism for locking a seat belt retractor to prevent withdrawal of seat belt webbing.

SUMMARY OF THE INVENTION

In view of the foregoing disadvantages inherent in the known types of seat belt retractor now present in the prior art, the present invention provides an improved seat belt electromagnetic lock, and overcomes the above-mentioned disadvantages and drawbacks of the prior art. As such, the general purpose of the present invention, which will be described subsequently in greater detail, is to provide a new and improved seat belt electromagnetic lock and method which has all the advantages of the prior art mentioned heretofore and many novel features that result in a seat belt electromagnetic lock which is not anticipated, rendered obvious, suggested, or even implied by the prior art, either alone or in any combination thereof.

To attain this, the present invention essentially comprises a locking wheel, the locking wheel having an outer edge, the locking wheel having multiple radial bores in its outer edge. A locking pin has a shape that is complementary to the locking wheel radial bore, for selectively fitting within the radial bore. A pin driver applies driving force to the locking pin. A removable locking key retains the locking pin in the locking wheel radial bore. A seat belt spindle is connected to the locking wheel. A seat belt is connected to the seat belt spindle. The seat belt attached at the bottom central part of the seat, the seat belt is divided into two sections near the top of the back of the seat, the seat belt sections extend downward over each side of the front of the seat.

There has thus been outlined, rather broadly, the more important features of the invention in order that the detailed description thereof that follows may be better understood and in order that the present contribution to the art may be better appreciated. The invention may also include a mounting base, a housing, a lock switch and a power connection. There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved seat belt electromagnetic lock that has all of the advantages of the prior art seat belt retractor and none of the disadvantages.

It is another object of the present invention to provide a new and improved seat belt electromagnetic lock that may be easily and efficiently manufactured and marketed.

An even further object of the present invention is to provide a new and improved seat belt electromagnetic lock that has a low cost of manufacture with regard to both materials and labor, and which accordingly is then susceptible of low prices of sale to the consuming public, thereby making such seat belt electromagnetic lock economically available to the buying public.

Still another object of the present invention is to provide a new seat belt electromagnetic lock that provides in the apparatuses and methods of the prior art some of the advantages thereof, while simultaneously overcoming some of the disadvantages normally associated therewith.

Even still another object of the present invention is to provide a seat belt electromagnetic lock for an electrically actuatable locking mechanism for locking a seat belt retractor to prevent withdrawal of seat belt webbing.

Still yet another object of the present invention is to provide a seat belt electromagnetic lock that eliminates the tension eliminator device to increase seat belt effectiveness.

Lastly, it is an object of the present invention to provide a seat belt electromagnetic lock that eliminates the energy absorbing plastic shaft or pendulum actuator of current seat belt designs which only function properly when no slack is present in the seat belt.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE PREFERRED EMBODIMENT

Referring now to the drawings, and particularly to FIGS. 1–5, a preferred embodiment of the seat belt electromagnetic lock of the present invention is shown and generally designated by the reference numeral 10.

Figure 1:
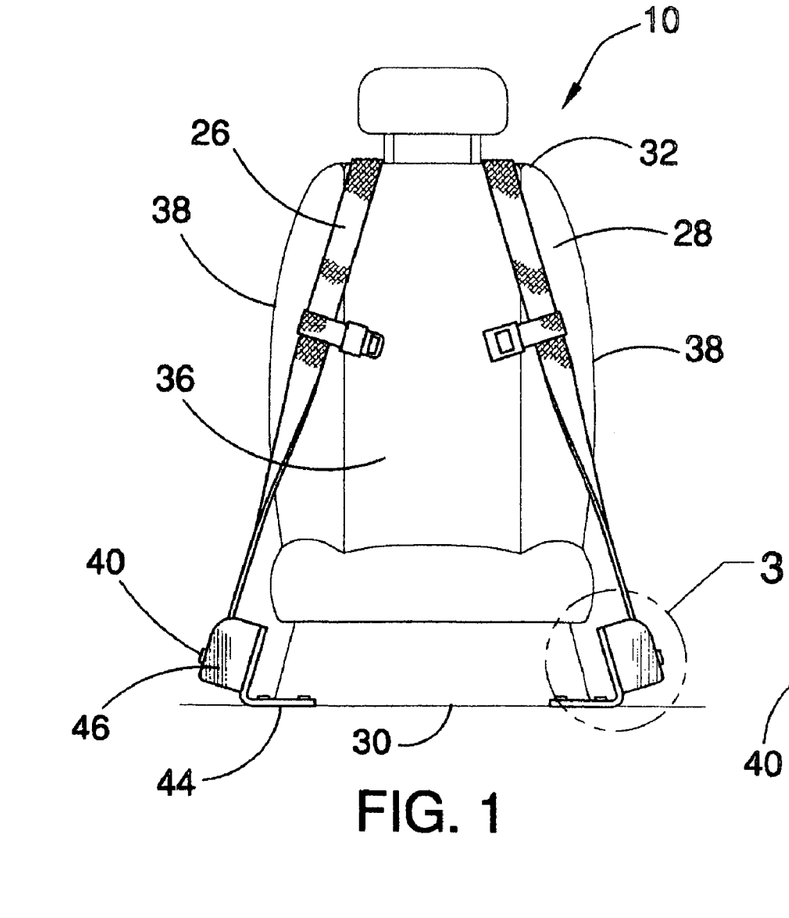
FIG. 1 is a front side view of the preferred embodiment of the seat belt electromagnetic lock constructed in accordance with the principles of the present invention.

In FIG. 1, a new and improved seat belt electromagnetic lock 10 of the present invention for the electrically actuatable locking mechanism for locking the seat belt retractor to prevent withdrawal of seat belt webbing is illustrated and will be described. More particularly, the seat belt electromagnetic lock 10 has a seat belt 26. The seat belt 26 sections extending downward over each side 38 of a front 36 of a seat 28. A housing 46 is connected to a mounting base 44. A lock switch 40 is connected to the housing 46.

Figure 2:
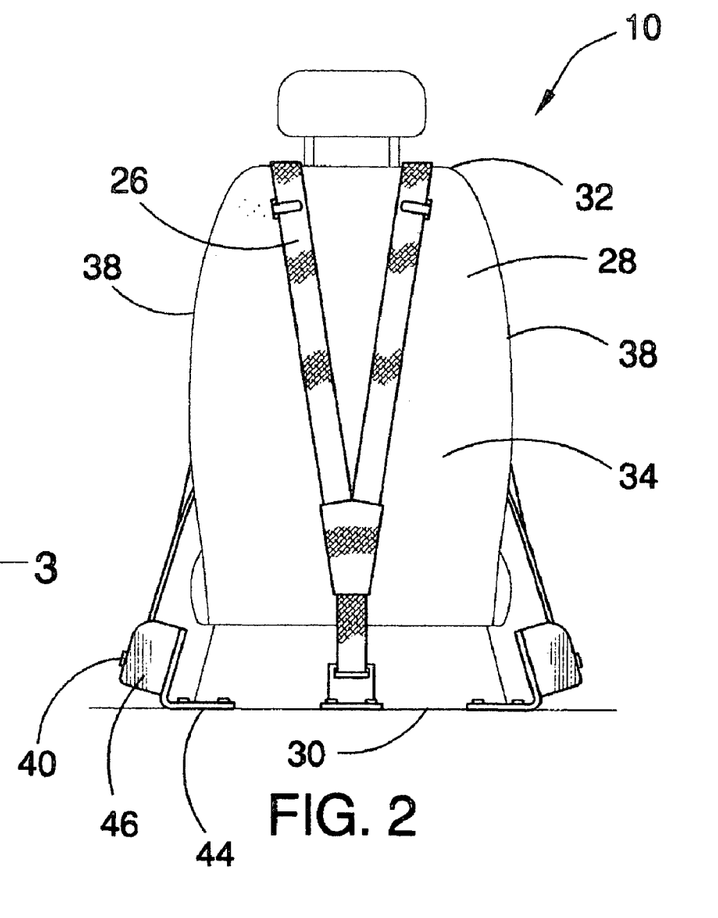
FIG. 2 is a rear side view of the seat belt electromagnetic lock of the present invention.

In FIG. 2, the seat belt electromagnetic lock 10 of the present invention is illustrated and will be described. The seat belt electromagnetic lock 10 has the seat belt 26. The seat belt 26 is attached at a bottom 30 central part of the seat 28. The seat belt 26 is divided into two sections near a top 32 of a back 34 of the seat 28. The housing 46 is connected to the mounting base 44. The lock switch 40 is connected to the housing 46.

Figure 3:
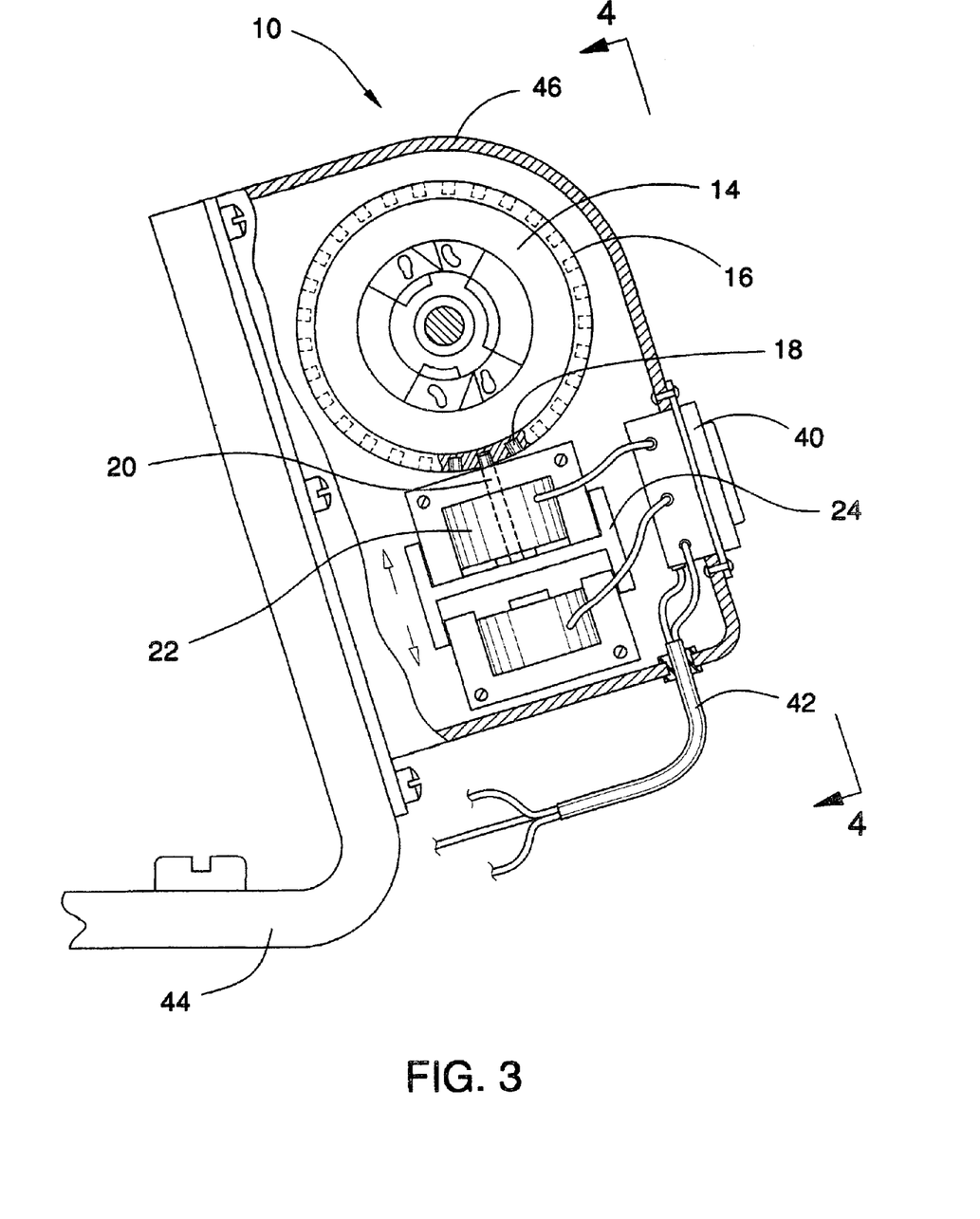
FIG. 3 is a section 3 view of FIG. 1 of the seat belt electromagnetic lock of the present invention.

In FIG. 3, the seat belt electromagnetic lock 10 of the present invention is illustrated and will be described. A locking wheel 14 has an outer edge 16 and a plurality of radial bores 18 disposed within the outer edge 16. A locking pin 20, which is magnetic in the present example, has the shape that is complementary to the locking wheel radial bore 18, for selectively fitting within the radial bore 18. A electromagnet pin driver 22 applies driving force to the locking pin 20. A removable locking key 24 retains the locking pin 20 in the locking wheel 14 radial bore. The lock switch 40 is electrically connected to the pin driver 22. A power connection 42 is electrically connected to the lock switch 40. The mounting base 44 is rotatably connected to the locking wheel 14. The housing 46 is connected to the mounting base 44.

Figure 4:
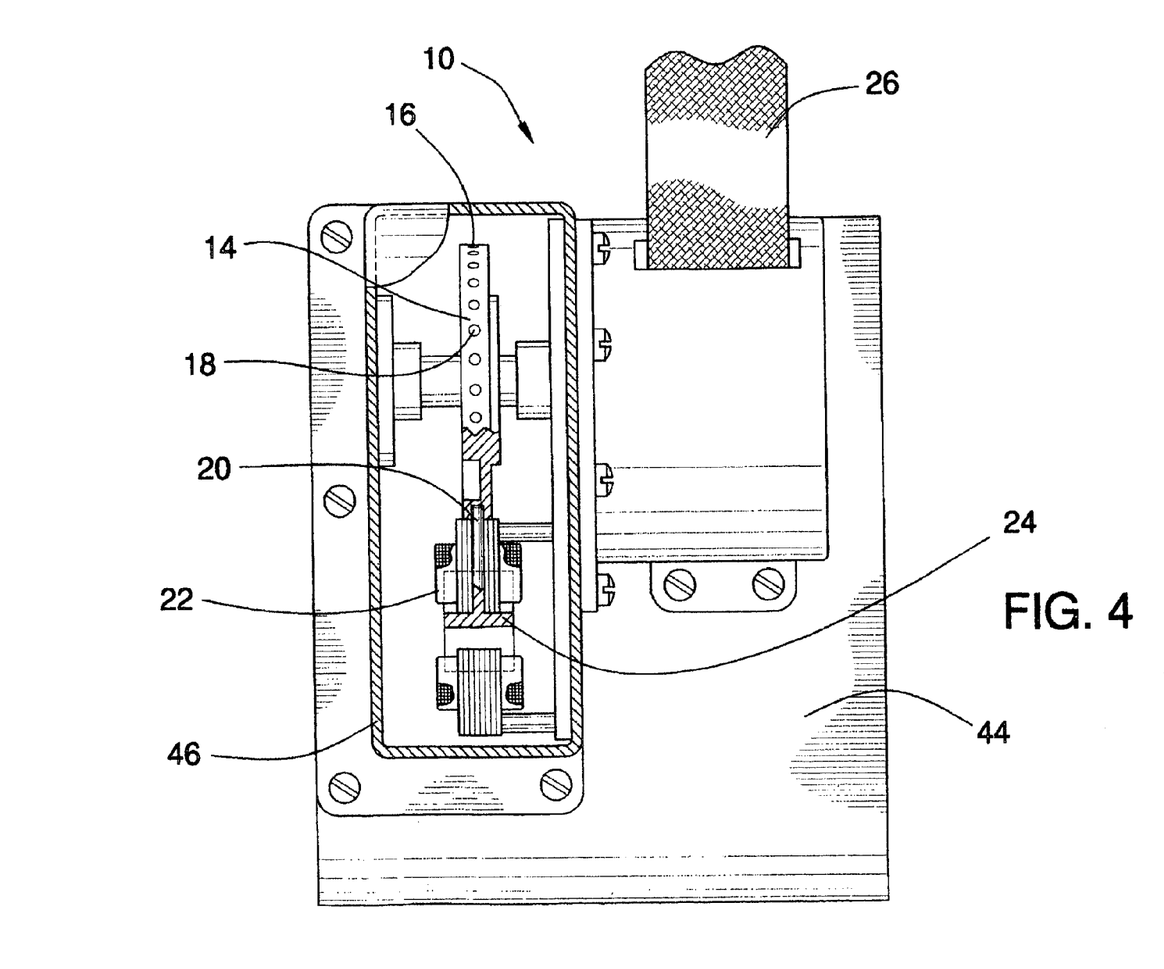
FIG. 4 is a section 4—4 view of FIG. 3 of the seat belt electromagnetic lock of the present invention.

In FIG. 4, the seat belt electromagnetic lock 10 of the present invention is illustrated and will be described. The locking wheel, which is ferrous in the present example, is connected to a seat belt spindle 12. The locking wheel 14 has the outer edge 16 and the radial bores 18 disposed within the outer edge 16. The magnetic locking pin 20 has the shape that is complementary to the locking wheel radial bore 18, for selectively fitting within the radial bore 18. The electromagnet pin driver 22 applies driving force to the locking pin 20. The removable locking key 24 retains the locking pin 20 in the locking wheel 14 radial bore. The seat belt 26 is connected to the seat belt spindle 12. The mounting base 44 is rotatably connected to the locking wheel 14. The housing 46 is connected to the mounting base 44.

Figure 5:
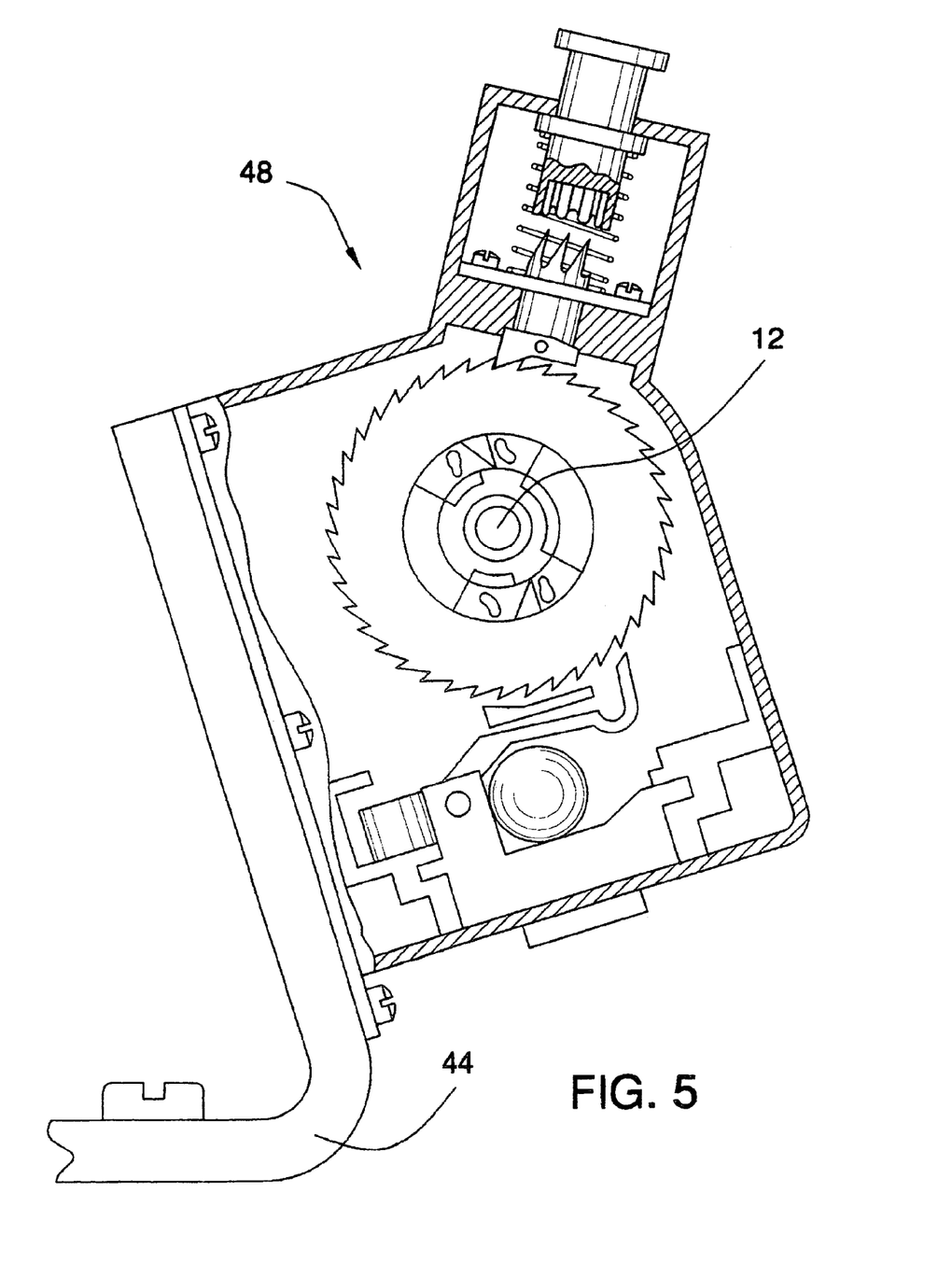
FIG. 5 is a section view of a conventional seat belt retractor.

In FIG. 5, a conventional seat belt retractor 48 is shown. The present invention can be connected to the seat belt spindle 12.

In use, it can now be understood that the electromagnetic lock seat belt differs from conventional seat belt use in that the lock switch 40 is pushed after the seat belt buckle is snapped closed. The lock switch 40 energizes the electromagnetic pin driver 22 forcing the locking pin 20 into the locking wheel radial bore 18 which secures the seat belt. If additional security is required a locking key 24 may be inserted into the housing 46 which will lock the locking pin 20 into the locking wheel radial bore 18.

While a preferred embodiment of the seat belt electromagnetic lock has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any suitable sturdy material such composite material may be used instead of the metal described. Also, the electromagnetic seat belt lock can be used either in conjunction with a conventional seat belt retractor or used alone. And although an electrically actuatable locking mechanism for locking a seat belt retractor to prevent withdrawal of seat belt webbing have been described, it should be appreciated that the seat belt electromagnetic lock herein described is also suitable for locking any webbing or cord on a reel.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A method of making a liquid crystal alignment layer for bistable nematic liquid crystal devices comprising two confinement plates provided respectively on both sides of a nematic liquid crystal layer, said liquid crystal alignment layer having a low zenithal and a strong azimuthal anchoring energies for the liquid crystal layer over at least one of its confinement plates, said method comprising:

depositing a copolymer of Poly(vinyl chloride) and poly (vinylacetate), to form said liquid crystal alignment layer, onto one of the two confinement plates;

stabilizing the polymer deposit, the stabilization comprising at least one thermal annealing step at a temperature below the melting point and higher than the vitreous transition temperature of the polymer deposit and an ultraviolet light exposure in the range of 180 nm to 400 nm after said thermal annealing; and defining an azimuth orientation for the deposit to induce strong and controlled azimuth anchoring of the liquid crystal, the zenithal anchoring being characterized by a critical electric field for breaking the anchoring below 10 V/$\mu$m, the azimuthal anchoring being characterized by an extrapolation length less than 100 nm.

2. The method according to claim 1 wherein the polymer is a terpolymer of Poly(vinylchloride-co-vinylacetate).

3. The method according to claim 2, wherein the polymer is a terpolymer of Poly(vinylchloride-co-vinylacetate) in which the third monomeric unit is hydroxypropyl acrylate or vinyl alcohol.

4. The method according to claim 1 wherein the stabilization implements at least one heating step of thermal annealing and said heating is performed for a duration of about 1 h 30.

5. The method according to claim 1 wherein said defining controlled azimuth anchoring of the liquid crystal is performed by rubbing the polymer with a textile-covered roller.

6. The method according to claim 1 wherein the polymer is deposited on the confinement plate by centrifuging.

* * * * *

UNITED STATES PATENT AND TRADEMARK OFFICE
CERTIFICATE OF CORRECTION

| | | |
|---|---|---|
| PATENT NO. | : 7,087,270 B2 | Page 1 of 5 |
| APPLICATION NO. | : 10/203829 | |
| DATED | : August 8, 2006 | |
| INVENTOR(S) | : Lamarque-Forget et al. | |

It is certified that error appears in the above-identified patent and that said Letters Patent is hereby corrected as shown below:

The title page should be deleted and substitute therefor the attached title page.

Delete columns 1 line 1 through columns 6 line 56 and insert columns 1 line 1 through columns 6 line 59, as shown on the attached pages.

Signed and Sealed this

Fifteenth Day of September, 2009

David J. Kappos
*Director of the United States Patent and Trademark Office*

United States Patent
Lamarque-Forget et al.

(10) Patent No.: US 7,087,270 B2
(45) Date of Patent: *Aug. 8, 2006

(54) METHOD FOR PRODUCING AN IMPROVED LIQUID CYSTAL DEVICE, AND RESULTING DEVICE

(75) Inventors: Sandrine Lamarque-Forget, Magny les Hameaux (FR); Julien Roux, Saint Joseph des Bancs (FR); Ivan N. Dozov, Gif sur Yvette (FR); Philippe R. Martinot-Lagarde, Marcoussis (FR)

(73) Assignee: Nemoptic, Magney les Hameaux (FR)

( * ) Notice: Subject to any disclaimer, the term of this patent is extended or adjusted under 35 U.S.C. 154(b) by 3 days.

This patent is subject to a terminal disclaimer.

(21) Appl. No.: 10/203,829

(22) PCT Filed: Dec. 11, 2001

(86) PCT No.: PCT/FR01/03921

§ 371 (c)(1),
(2), (4) Date: Nov. 18, 2002

(87) PCT Pub. No.: WO02/48782

PCT Pub. Date: Jun. 20, 2002

(65) Prior Publication Data

US 2003/0112396 A1    Jun. 19, 2003

(30) Foreign Application Priority Data

Dec. 12, 2000   (FR)   ................... 00 16135

(51) Int. Cl.
*B05D 5/06*    (2006.01)
*B05D 7/24*    (2006.01)
*B05D 3/02*    (2006.01)
*B05D 3/06*    (2006.01)
*G02F 1/1337*  (2006.01)

(52) U.S. Cl. .............. 427/553; 427/162; 427/165; 427/240; 427/355; 427/359; 427/384; 427/385.5; 428/1.2; 349/124

(58) Field of Classification Search ............ 427/553, 427/558, 162, 164, 165, 240, 425, 322, 355, 427/359, 368, 372.2, 384, 385.5; 428/1.2; 349/123, 124, 126, 128, 135, 136, 177, 186
See application file for complete search history.

(56) References Cited

U.S. PATENT DOCUMENTS

| | | | | |
|---|---|---|---|---|
| 4,029,876 A | * | 6/1977 | Beatty et al. | 204/165 |
| 4,608,129 A | * | 8/1986 | Tamamura et al. | 205/50 |
| 5,268,783 A | * | 12/1993 | Yoshinaga et al. | 349/88 |
| 5,648,829 A | * | 7/1997 | Yano | 349/129 |
| 5,805,253 A | * | 9/1998 | Mori et al. | 349/118 |
| 5,837,354 A | * | 11/1998 | Ogisu et al. | 428/208 |
| 6,084,649 A | * | 7/2000 | Amano et al. | 349/96 |
| 6,310,674 B1 | * | 10/2001 | Suzuki et al. | 349/139 |
| 6,791,649 B1 | * | 9/2004 | Nakamura et al. | 349/137 |
| 2003/0232154 A1 | * | 12/2003 | Lamarque-Forget et al. | 428/1.6 |

FOREIGN PATENT DOCUMENTS

GB    2 330 213   A   *   4/1999

* cited by examiner

*Primary Examiner*—Timothy Meeks
*Assistant Examiner*—Wesley D. Markham
(74) *Attorney, Agent, or Firm*—Blakely Sokoloff Taylor & Zafman (57) ABSTRACT

A method of making nematic liquid crystal devices where low energy zenith anchoring of the liquid crystal is obtained over confinement plates. A polymer or copolymer is deposited based on PVC onto a substrate. The polymer deposit is stabilized. An azimuth orientation is defined for the deposit to induce controlled azimuth anchoring of the liquid crystal.

6 Claims, No Drawings

METHOD FOR PRODUCING AN IMPROVED LIQUID CYSTAL DEVICE, AND RESULTING DEVICE

This is a non-provisional application claiming the benefit of International application number PCT/FR01/03921 filed Dec. 11, 2001.

The present invention relates to the field of liquid crystal display devices.

More precisely, a main object of the present invention is to propose novel means for anchoring liquid crystal molecules in display cells.

In general, liquid crystal display devices comprise two confinement plates or substrates having electrodes on their inside surfaces and a liquid crystal material placed between the two plates. Means are also provided on the confinement plates for anchoring and controlling the anchoring of liquid crystal molecules.

The person skilled in the art knows in particular how to orient nematic liquid crystals either perpendicularly to the surface of the substrate (this orientation is said to be "homeotropic") or else parallel thereto (this orientation is said to be "planar"), using surface treatments such as depositing polymers.

Still more precisely, "helical nematic" liquid crystal displays require anchoring that is strong and planar, or more precisely slightly oblique. Such strong planar anchoring is usually obtained in the prior art by depositing orientated polymers or by evaporating SiO at a given angle.

Another family of liquid crystal displays has recently appeared (document WO-97/17632), in which family the nematic displays operate by breaking surface anchoring. Those displays are bistable and the display therefore remains indefinitely in a state selected from two possible states without consuming energy; energy is required only to switch between two states. Another advantage of being bistable is the possibility of achieving high definition since the number of display lines is a function only of the ratio of the time available before the information needs to be changed and the time required for writing one line. This makes it possible to have more than 10,000 lines. The major difficulty in making displays of that type is nevertheless associated with the need to break the anchoring on the surface: it is necessary for the anchoring to be reproducible and to require little energy. The main utility of the present invention lies in making displays of that type.

A typical example of such bistable nematic displays using weak anchoring is made as follows. The liquid crystal is placed between two plates of glass coated in a conductive layer of indium and tin oxide (ITO). One of the electrodes carries a coating that gives strong planar oblique anchoring, and the other electrode carries a coating that gives planar monostable anchoring with weak anchoring energy in the zenith direction and medium or strong anchoring energy in the azimuth direction. Two polarizers are also placed on either side of the cell with appropriate orientations.

The principle of this "bistable" technology lies in the presence of two stable states without any need to apply an electric field, a uniform state, and a state twisted by 180°. Those two states correspond to minimum energy levels. They are balanced by using a nematic liquid crystal with positive dielectric anisotropy, for example pentyl cyano biphenyl (known as "5CB") doped with a chiral additive.

The display technology makes use of the possibility of breaking the weak planar anchoring and makes use of the persistence of the strong planar anchoring to switch from one state to the other, by applying an electric field of specific shape and intensity. This field extends perpendicularly to the cell and induces a homeotropic texture that is close to the "black" state in twisted nematic (TN) technology but in which the molecules close to the low anchoring energy surface are perpendicular thereto. This non-equilibrium texture is the transition state that makes it possible to switch to one or other of the two stable states. When the field is removed, the state will convert to one or other of the stable states depending on which elastic or hydrodynamic coupling effects have been favored.

Various means have already been proposed for anchoring liquid crystal materials.

Nevertheless, it turns out to be very difficult to identify means that give full satisfaction because of the numerous constraints with which the anchoring means must comply.

In particular, the person skilled in the art knows that the anchoring means must: 1) be soluble in a medium in order to be applied appropriately to the receiving plate or substrate so as to wet it and cover it properly; 2) be suitable for making the plate or substrate aniostropic; 3) be non-soluble in the liquid crystal material; and 4) define anchoring that gives the desired orientation and energy.

Although means are already available that are suitable for defining satisfactory strong anchoring, there are very few means available that are suitable for providing weak anchoring (this concept is explained in greater detail below).

An object of the present invention is thus to propose novel means suitable for defining weak anchoring.

In the present invention, this object is achieved by a method of preparing liquid crystal cells, the method comprising the steps consisting in:

depositing a polymer or copolymer based on polyvinylchloride (PVC) onto a substrate;

stabilizing the polymer deposit; and defining an azimuth orientation for the deposit to induce controlled azimuth anchoring of the liquid crystal.

According to an advantageous characteristic of the present invention, the polymer deposit is stabilized thermally and/or by ultraviolet exposure.

The present invention makes it possible to provide low energy anchoring layers (alignment layers) in liquid crystal display cells, and in particular bistable nematic liquid crystal cells.

According to other advantageous characteristics of the present invention:

the stabilization implements exposure to ultraviolet light;

the stabilization implements one or more annealing steps;

the stabilization uses one or more annealing steps performed before and/or after exposure;

the polymer is selected from the group comprising PVC and a copolymer of PVC and polyvinylacetate (PVAc);

the polymer is a terpolymer based on PVC-PVAc;

the polymer is a terpolymer based on PVC-PVAc in which the third monomer is hydroxypropyl acrylate or vinyl alcohol;

the heating step(s) is/are performed at temperatures below the melting point (mp) of the polymer;

the heating step(s) is/are performed for a duration of about one hour and thirty minutes (1h30);

the exposure step is performed using ultraviolet light having a wavelength lying in the range 180 nanometers (nm) to 400 nm;

the step consisting in defining controlled azimuth anchoring of the liquid crystal is performed by the fact that the polymer of the invention (PVC and PVC-PVAc copolymers) is rubbed with a textile-covered roller;

the step consisting in defining controlled azimuth anchoring of the liquid crystal is performed by depositing the polymer on a substrate that has already been made anisotropic by special treatment such as: another brushed or stretched polymer; evaporated SiO or other oxide; a grating (etched, printed, or photoinduced);

the polymer is deposited on the substrate by centrifuging;

the polymer is deposited in solution in a solvent based on ketone, such as methyl ethyl ketone or dimethyl formamide; and the anchoring layer having low zenith energy is deposited on an electrode that is transparent or reflecting.

The present invention also provides devices obtained in this way.

The notions of "strong" anchoring and "weak" anchoring are explained below.

The terms "strong anchoring" and "weak anchoring" can be defined as explained below. The origin of the molecular anchoring of the liquid crystal is anisotropy in its interactions with the orientation layer. Molecular anchoring can be characterized by its effectiveness and by the direction it imparts to the liquid crystal molecules in the absence of any other external influence. This direction is known as the "easy" axis and it is represented by the unit vector $\vec{n}_o$ or by its zenith and azimuth angles $\theta_o$ and $\phi_o$ in the Cartesian coordinate system having its Z axis perpendicular to the surface of the substrate.

If the easy axis of the liquid crystal molecules is perpendicular to the substrate, then the alignment is "homeotropic". If it is parallel to the substrate, then the alignment is "planar". Between those two extremes, alignment is said to be "oblique" and is defined by the zenith anchoring angle given relative to the normal to the surface of substrate, or by its complement preferred to as the "pretilt" angle.

The strength of the interaction between the liquid crystal and the substrate is characterized by reference to energy density per unit area $\gamma$. It depends on the orientation $\vec{n}_s$ of the liquid crystal molecules on the surface (also defined by the zenith and azimuth angles $\theta_s$ and $\phi_s$):

$$\gamma(\theta_s,\phi_s)=\gamma(\theta_o,\phi_o)+g(\theta_s-\theta_o,\phi_s-\phi_o)$$

where g represents the anchoring energy. It characterizes the anisotropic portion of the interaction and, by convention, it becomes zero when the molecular orientation of the liquid crystal coincides with the direction of the easy access.

In most experiments, variation in one or other of the two angles (zenith or azimuth) is preponderant. That is why the two components of anchoring energy are often studied separately. The best known form anchoring energy is that proposed by Rapini and Papoular (PG de Gennes "J. Phys. Coll.", 30, C-4, (1969)):

$$g(\theta, \phi) = \frac{w_z}{2}\sin^2(\theta) + \frac{w_a}{2}\sin^2(\phi)$$

The positive coefficients $w_z$ and $w_a$ are usually referred respectively as the zenith anchoring energy and as the azimuth anchoring energy. They have the dimensions of energy density per unit area.

Anchoring energy can also be given by the extrapolation length. This is the distance between the surface under study and the position of a virtual surface. By imposing infinitely strong anchoring (where it is impossible to cause the molecules situated on the virtual surface to pivot), it induces the real texture of the liquid crystal. The zenith extrapolation length $L_z$ is proportional to the inverse of the anchoring energy $w_z$ i.e. $L_z = k_{11}/w_z$ where $k_{11}$ is the elasticity coefficient for fan deformation of the liquid crystal in question. Similarly, the azimuth extrapolation length is defined as $L_a = k_{22}/w_a$, where $k_{22}$ is the elasticity coefficient for twisting deformation of the liquid crystal in question.

As a general rule, anchoring is said to be "strong" when the molecules at the surface remain practically parallel to the easy access while the cell is in operation. In contrast, anchoring is said to be "weak" when if significant deflection appears in operation.

Zenith anchoring energy can be evaluated by a simple method described below: measuring the crystal field for breaking anchoring.

It is known that in a liquid crystal cell, surface anchoring can be "broken" by using an electric field $E>E_c$ normal to the plates, applied to a nematic liquid crystal having positive dielectric anisotropy $\epsilon_a=\epsilon_{//}-\epsilon_{\perp}>0$. For E increasing and approaching $E_c$, the surface molecular angle $\theta_s$ passes quickly from 90° to 0. This corresponds to detectable variation in the birefringence of the cell. Above $E_c$, the angle $\theta_s$ remains zero, and the surface is said to be "broken".

The critical field $E_c$ for breaking the anchoring is defined by the following condition:

$$E_c = \frac{1}{L_z}\sqrt{\frac{K}{\epsilon_o \epsilon_a}}$$

K is the elastic constant of curvature ($\approx 10$ piconewtons (pN)) and $L_z$ is the extrapolation length defining the zenith anchoring energy which is written as follows:

$w_z=(1/2)(K/L_z)\cos^2\theta_s$ (where $\theta_s$ is the angle of the surface molecules).

For zenith anchoring, it is considered that the anchoring is strong if $L_z<20$ nanometers (nm) ($E_c>20$ volts per micrometer (V/μm)) and weak if $L_z>40$ nm ($E_c<10$ V/μm). Azimuth anchoring is an order of magnitude smaller. Azimuth anchoring is considered to be strong is $L_a<100$ nm.

In the context of the present invention, low energy zenith anchoring is obtained by depositing specially selected polymers based on PVC subjected to a sequence of specific treatments.

The anchoring layer based on PVC is deposited from a polymer solution by centrifuging. After the solvent has evaporated, a layer of polymer is obtained having a thickness that typically lies in the range a few nanometers to 100 nm (although this is not limiting on the invention).

Thereafter, it is preferable to apply rubbing using a textile roller of the prior art to the polymer layer in order to impose an azimuth orientation thereon so as to induce azimuth anchoring of the liquid crystal.

To make a cell that is bistable by breaking anchoring, the "weak" anchoring surface must present planar anchoring with relatively weak zenith anchoring energy (e.g. $L_z \geq 40$ nm) and azimuth anchoring that is relatively strong ($L_a<<d$, where d is the thickness of the cell).

The polymers and copolymers of the invention are PVC (I) and PVC-PVAc copolymers (II) having the following formulas:

By way of example PVC-PVAc copolymers (II) of the invention have 80:20 compositions and can vary.

Terpolymers derived from PVC, PVAc and a co-monomer also enable low energy anchoring layers to be obtained and constitute a variant of the invention. An example of a suitable copolymer is hydroxypropyl acrylate or vinyl alcohol.

The polymers and copolymers are deposited on the substrate by centrifuging a solution. Appropriate solvents are constituted, for example, by ketones such as methyl ethyl ketone or dimethyl formamide.

After annealing at a temperature below the melting point (mp), (and higher than the vitreous transition temperature Tg), preferably between 140° C. and 150° C., for a length of time lying in the range a few minutes to a few hours (typically 30 min to 2 h, e.g. about 1h30), the polymer layer is exposed to UV radiation having a wavelength lying in the range 180 nm to 400 nm, and optionally annealed at a temperature lying in the range 130° C. to 170° C. The polymer layer is then rubbed using a roller in order to induce azimuth orientation.

The layers are generally made on a conventional ITO substrate, but other electrodes could be envisaged.

In a variant of the invention, the azimuth orientation of the anchoring layer can be obtained by methods other than rubbing with a roller, for example by using a substrate that has previously been treated:
- by oblique evaporation of SiO;
- by a polymer brushed with a roller or stretched; or
- by a grating etched in the substrate, printed, or photoinduced.

The method of the present invention makes it possible to obtain an alignment layer with weak zenith anchoring.

Two example implementations of the invention are described below.

A first example enables a liquid crystal cell having a thickness of 1.3 microns to be assembled between two ITO covered glass plates. One plate received an evaporation of SiO (thickness 107 nm, angle of incidence 82.5°) in order to obtain highly inclined anchoring. The other electrode was covered in PVC to a thickness of 20 nm to 30 nm and treated using the method of the invention:
Step 1: the polymer was deposited by centrifuging from a 0.5% by weight solution in methyl ethyl ketone;
Step 2: annealing at 150° C. for 1h30;
Step 3: exposure ($\lambda$=254 nm) for 20 hours to a 6 watt mercury vapor lamp;
Step 4: annealing at 150° C. for 30 minutes; and
Step 5: brushing to induce azimuth anchoring with a roller covered in a textile velvet.

The two above-described plates were assembled together to make a cell in compliance with the concept described in document WO 97/17632. The cell was filled with doped 5 CB liquid crystal (chiral pitch=5.6 microns). The cell was operated using 13 volt pulses at ambient temperature and presented a contrast ratio of 50.

In another example of the invention, the liquid crystal used was a mixture adapted from the technology complying with the concept described in document WO 97/17632. The operating range then extended from 18° C. to more than 60° C. using the same 13 volt control pulses.

The weak planar anchoring prepared by the invention has the following characteristics:
- the alignment layers are chemically and mechanically stable over time, and in contact with the liquid crystal mixtures used;
- the anchoring is planar, the pretilt is zero, to within the accuracy of the measurements used, i.e. less than 0.2°; and
- the extrapolation length of the zenith anchoring as measured by a strong field technique for 5 CB at a temperature of 22° C. is close to $L_z$=50 nm and varies little as a function of the polymer used in accordance with the invention (PVC-PVAc).

Several commercially available nematic mixtures were tested and the extrapolation length lay in the range 30 nm to 60 nm as a function of the mixture and the temperature. These values correspond to zenith anchoring energies that are much lower than those obtained with the conventional polymers used in helical nematic displays.

The azimuth anchoring force obtained depends on the treatment performed on the layers. By way of example, with brushing azimuth extrapolation lengths were obtained lying in the range 50 nm to 200 nm. These values are compatible with cells operating in compliance with the concept described in document WO 97/17632.

The present invention presents the following advantages in particular. In the state of the art, making low energy anchoring, i.e. using a layer of silicon oxide (SiO) needs to be performed in a vacuum. The vacuum deposition process is length and expensive and it is difficult to monitor.

Compared with the known process for making low energy anchoring, using a polymer layer of the present invention offers significant advantages in terms of simplicity and reduced manufacturing costs.

Naturally, the present invention is not limited to the particular embodiments described above, but it extends to any variant within the spirit of the invention.

We claim:

1. A method of making a liquid crystal alignment layer for bistable nematic liquid crystal devices comprising two confinement plates provided respectively on both sides of a nematic liquid crystal layer, said liquid crystal alignment layer having a low zenithal and a strong azimuthal anchoring energies for the liquid crystal layer over at least one of its confinement plates, said method comprising:
depositing a copolymer of Poly(vinyl chloride) and poly(vinylacetate), to form said liquid crystal alignment layer, onto one of the two confinement plates;
stabilizing the polymer deposit, the stabilization comprising at least one thermal annealing step at a temperature below the melting point and higher than the vitreous transition temperature of the polymer deposit and an ultraviolet light exposure in the range of 180 nm to 400 nm after said thermal annealing; and
defining an azimuth orientation for the deposit to induce strong and controlled azimuth anchoring of the liquid crystal,
the zenithal anchoring being characterized by a critical electric field for breaking the anchoring below 10 V/μm, the azimuthal anchoring being characterized by an extrapolation length less than 100 nm.

2. The method according to claim 1 wherein the polymer is a terpolymer of Poly(vinylchloride-co-vinylacetate).

3. The method according to claim 2, wherein the polymer is a terpolymer of Poly(vinylchloride-co-vinylacetate) in which the third monomeric unit is hydroxypropyl acrylate or vinyl alcohol.

4. The method according to claim 1 wherein the stabilization implements at least one heating step of thermal annealing and said heating is performed for a duration of about 1 h 30.

5. The method according to claim 1 wherein said defining controlled azimuth anchoring of the liquid crystal is performed by rubbing the polymer with a textile-covered roller.

6. The method according to claim 1 wherein the polymer is deposited on the confinement plate by centrifuging.

* * * * *